United States Patent
Zhang et al.

(10) Patent No.: US 12,003,419 B2
(45) Date of Patent: Jun. 4, 2024

(54) METHOD AND APPARATUS FOR ASSIGNING NETWORK ADDRESS PREFIX

(71) Applicant: Telefonaktiebolaget LM Ericsson (publ), Stockholm (SE)

(72) Inventors: Wen Zhang, Shanghai (CN); Yong Yang, Kållered (SE); Yingjiao He, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/034,796

(22) PCT Filed: Sep. 27, 2021

(86) PCT No.: PCT/CN2021/121059
§ 371 (c)(1),
(2) Date: May 1, 2023

(87) PCT Pub. No.: WO2022/095630
PCT Pub. Date: May 12, 2022

(65) Prior Publication Data
US 2023/0412506 A1    Dec. 21, 2023

(30) Foreign Application Priority Data
Nov. 4, 2020    (WO) ................ PCT/CN2020/126610

(51) Int. Cl.
*H04L 45/42*    (2022.01)
*H04L 45/748*    (2022.01)

(52) U.S. Cl.
CPC ............ *H04L 45/748* (2013.01); *H04L 45/42* (2013.01)

(58) Field of Classification Search
CPC . H04L 45/748; H04L 45/42; H04L 2101/659; H04L 2101/668; H04L 61/5007; H04L 67/14; H04W 8/26
(Continued)

(56) References Cited

U.S. PATENT DOCUMENTS

2020/0053828 A1* 2/2020 Bharatia ............... H04W 76/11
2020/0228936 A1* 7/2020 Talebi Fard .......... H04W 8/186
(Continued)

OTHER PUBLICATIONS

Author Unknown, "Technical Specification Group Services and System Aspects; Wireless and wireline convergence access support for the 5G System (5GS) (Release 16)," Technical Specification 23.316, Version 16.5.0, Sep. 2020, 3GPP Organizational Partners, 83 pages.
(Continued)

*Primary Examiner* — Karen C Tang
(74) *Attorney, Agent, or Firm* — Withrow & Terranova, PLLC

(57) ABSTRACT

Embodiments of the present disclosure provide methods and apparatuses for assigning network address prefix. A method performed by a control plane function may comprise: receiving, from a terminal device, a request for assigning a network address prefix; determining whether the network address prefix is assigned by the control plane function or a user plane function; transmitting, to the user plane function, a PFCP Session Modification Request for requesting the user plane function to assign the network address prefix, if it is determined that the network address prefix is assigned by the user plane function; receiving, from the user plane function, a PFCP Session Modification Response including an assigned network address prefix; and transmitting the assigned network address prefix to the terminal device. The specific procedure for the terminal device to obtain the
(Continued)

network address prefix from a network entity not directly requested by the terminal device may be defined.

20 Claims, 12 Drawing Sheets

(58) Field of Classification Search
USPC .......................................................... 709/231
See application file for complete search history.

(56) References Cited

U.S. PATENT DOCUMENTS

| | | | |
|---|---|---|---|
| 2021/0051564 A1* | 2/2021 | Muley | H04L 67/142 |
| 2022/0116822 A1* | 4/2022 | Sahin | H04W 28/0835 |
| 2023/0413212 A1* | 12/2023 | De Foy | H04W 4/46 |

OTHER PUBLICATIONS

Author Unknown, "Technical Specification Group Services and System Aspects; General Packet Radio Service (GPRS) enhancements for Evolved Universal Terrestrial Radio Access Network (E-UTRAN) access (Release 16)," Technical Specification 23.401, Version 16.8.0, Sep. 2020, 3GPP Organizational Partners, 440 pages.

Author Unknown, "Technical Specification Group Core Network and Terminals; Interface between the Control Plane and the User Plane Nodes; Stage 3 (Release 16)," Technical Specification 29.244, Version 16.5.0, Sep. 2020, 3GPP Organizational Partners, 313 pages.

Ericsson, "C4-204272: Report of UE IP address Allocation Status," 3GPP TSG-CT WG4 Meeting #99e, Aug. 18-28, 2020, Electronic Meeting, 15 pages.

International Search Report and Written Opinion for International Patent Application No. PCT/CN2021/121059, dated Jan. 11, 2022, 15 pages.

International Preliminary Report on Patentability for International Patent Application No. PCT/CN2021/121059, dated Feb. 1, 2023, 19 pages.

\* cited by examiner

METHOD AND APPARATUS FOR ASSIGNING NETWORK ADDRESS PREFIX

This application is a 35 U.S.C. § 371 national phase filing of International Application No. PCT/CN2021/121059, filed Sep. 27, 2021, which claims the benefit of International Application No. PCT/CN2020/126610, filed Nov. 4, 2020, the disclosures of which are incorporated herein by reference in their entireties.

FIELD OF THE INVENTION

The present disclosure generally relates to communication networks, and more specifically, to a method and an apparatus for assigning network address prefix.

BACKGROUND

This section introduces aspects that may facilitate a better understanding of the disclosure. Accordingly, the statements of this section are to be read in this light and are not to be understood as admissions about what is in the prior art or what is not in the prior art.

When a terminal device is connected in a communication network and needs to exchanging data/packet (such as internet protocol, IP, data/packet), at least one network address (such as IP address), will be necessary for identifying the terminal device. Particularly, the terminal device may request a range of addresses in some cases. For example, the terminal device may allocate a plurality of IP addresses from the range of addresses for other devices which are managed/served by the terminal device. Such range or IP addresses may have a prefix, and other parts (such as suffix). The prefix may be the same for those other devices served by the terminal device, and the suffix may be variable according to the specific device.

It is desired for the terminal device to obtain such prefix from a network entity/server, when needed.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Current technical specifications, TS, of $3^{rd}$ generation partnership project, 3GPP, define a mechanism for such prefix management. For example, according to standard TS 29.244 V16.5.0, clause 5.14, Support IPv6 Prefix Delegation, the CP function shall assign, or request the UP function to assign (if the UP function indicates support of the UEIP feature, see clause 8.2.25), the network prefix shorter than the default /64 prefix by provisioning the UE IP Address IE in the UP function.

But in current standard, only how the control plane, CP, function assigns the network prefix is defined. How the user plane, UP, funtion assigns the network prefix is not defined.

Namely, it is already defined that a network entity (such as the CP function) may receive a request from a terminal device for assigning a network address prefix, and if the network entity supports the feature for assigning the network address prefix, it will assign the network address prefix to the terminal device according to the standards. However, when the network entity (such as the CP function) requested by the terminal device does not assign the network address prefix, the specific procedure for the terminal device to obtain the network address prefix is not defined yet.

Certain aspects of the present disclosure and their embodiments may provide solutions to these or other challenges. There are, proposed herein, various embodiments which address one or more of the issues disclosed herein. For example, in embodiments of the present disclosure, the specific procedure for the terminal device to obtain the network address prefix from a network entity not directly requested by the terminal device (namely, the network entity not handling the original request from the terminal device) may be defined.

According to a first aspect of the present disclosure, there is provided a method performed by a control plane function. The method may comprise: receiving, from a terminal device, a request for assigning a network address prefix; determining whether the network address prefix is assigned by the control plane function or a user plane function; transmitting, to the user plane function, a Packet Forwarding Control Protocol, PFCP, Session Modification Request for requesting the user plane function to assign the network address prefix, if it is determined that the network address prefix is assigned by the user plane function; receiving, from the user plane function, a PFCP Session Modification Response including an assigned network address prefix; and transmitting the assigned network address prefix to the terminal device. The PFCP Session Modification Request may include a first parameter indicating that the user plane function is delegated to assign the network address prefix, and the PFCP Session Modification Response may include a second parameter indicating assigned network address prefix by the user plane function.

In exemplary embodiments of the present disclosure, the first parameter or the second parameter may comprise a field for IPv6 Prefix Delegation Bits and/or a field for IPv6 Prefix Length.

In exemplary embodiments of the present disclosure, the IPv6 Prefix Delegation bits and/or IPv6 Prefix Length is set to zero.

In exemplary embodiments of the present disclosure, the assigned network address prefix is an internet protocol version 6, IPv6, prefix.

In exemplary embodiments of the present disclosure, the PFCP Session Modification Response comprises an information element for IP address of the terminal device; and the information element for IP address of the terminal device comprises the second parameter.

In exemplary embodiments of the present disclosure, an information element of Updated Packet Detection Rule, PDR includes the field for IPv6 Prefix Delegation Bits and/or the field for IPv6 Prefix Length.

In exemplary embodiments of the present disclosure, the control plane function comprises a session management function, SMF, and/or a packet data network gateway-control plane, PGW-C.

According to a second aspect of the present disclosure, there is provided a method performed by a user plane function. The method may comprise: receiving, from a control plane function, a PFCP Session Modification Request for requesting the user plane function to assign a network address prefix to a terminal device; transmitting, to the control plane function, a PFCP Session Modification Response including an assigned network address prefix. The PFCP Session Modification Request may include a first parameter indicating that the user plane function is delegated to assign the network address prefix, and the PFCP Session Modification Response may include a second parameter indicating assigned network address prefix by the user plane function.

In exemplary embodiments of the present disclosure, the user plane function determines a length of the network address prefix based on a local configuration, or based on the PFCP Session Modification Request from the control plane function.

In exemplary embodiments of the present disclosure, the first parameter or the second parameter may comprise a field for IPv6 Prefix Delegation Bits and/or a field for IPv6 Prefix Length.

In exemplary embodiments of the present disclosure, the IPv6 Prefix Delegation bits and/or IPv6 Prefix Length is set to zero.

In exemplary embodiments of the present disclosure, the assigned network address prefix is an internet protocol version 6, IPv6, prefix.

In exemplary embodiments of the present disclosure, the PFCP Session Modification Response comprises an information element for IP address of the terminal device; and the information element for IP address of the terminal device comprises the second parameter.

In exemplary embodiments of the present disclosure, an information element of Updated Packet Detection Rule, PDR includes the field for IPv6 Prefix Delegation Bits and/or the field for IPv6 Prefix Length.

In exemplary embodiments of the present disclosure, the control plane function comprises a session management function, SMF, and/or a packet data network gateway-control plane, PGW-C.

According to a third aspect of the present disclosure, there is provided a control plane function, comprising: one or more processors; and one or more memories comprising computer program codes, the one or more memories and the computer program codes configured to, with the one or more processors, cause the terminal device at least to: receive, from a terminal device, a request for assigning a network address prefix; determine whether the network address prefix is assigned by the control plane function or a user plane function; transmit, to the user plane function, a PFCP Session Modification Request for requesting the user plane function to assign the network address prefix, if it is determined that the network address prefix is assigned by the user plane function; receive, from the user plane function, a PFCP Session Modification Response including an assigned network address prefix; and transmit the assigned network address prefix to the terminal device. The PFCP Session Modification Request may include a first parameter indicating that the user plane function is delegated to assign the network address prefix, and the PFCP Session Modification Response may include a second parameter indicating assigned network address prefix by the user plane function.

In exemplary embodiments of the present disclosure, the one or more memories and the computer program codes are configured to, with the one or more processors, cause the control plane function to perform the method according to any one of embodiments of the first aspect of the present disclosure.

According to a fourth aspect of the present disclosure, there is provided a user plane function, comprising: one or more processors; and one or more memories comprising computer program codes, the one or more memories and the computer program codes configured to, with the one or more processors, cause the terminal device at least to: receive, from a control plane function, a PFCP Session Modification Request for requesting the user plane function to assign a network address prefix to a terminal device; transmit, to the control plane function, a PFCP Session Modification Response including an assigned network address prefix. The PFCP Session Modification Request may include a first parameter indicating that the user plane function is delegated to assign the network address prefix, and the PFCP Session Modification Response may include a second parameter indicating assigned network address prefix by the user plane function.

In exemplary embodiments of the present disclosure, the one or more memories and the computer program codes are configured to, with the one or more processors, cause the user plane function to perform the method according to any one of embodiments of the second aspect of the present disclosure.

According to a fifth aspect of the present disclosure, there is provided a computer-readable medium having computer program codes embodied thereon for use with a network entity, wherein the computer program codes comprise codes for performing the method according to any one of embodiments above mentioned.

According to a sixth aspect of the present disclosure, there is provided an apparatus for a control plane function. The apparatus comprises: a first receiving unit, configured to receive, from a terminal device, a request for assigning a network address prefix; a determining unit, configured to determine whether the network address prefix is assigned by the control plane function or a user plane function; a first transmitting unit, configured to transmit, to the user plane function, a PFCP Session Modification Request for requesting the user plane function to assign the network address prefix, if it is determined that the network address prefix is assigned by the user plane function; a second receiving unit, configured to receive, from the user plane function, a PFCP Session Modification Response including an assigned network address prefix, if it is determined that the network address prefix is assigned by the user plane function; and a second transmitting unit, configured to transmit the assigned network address prefix to the terminal device. The PFCP Session Modification Request may include a first parameter indicating that the user plane function is delegated to assign the network address prefix, and the PFCP Session Modification Response may include a second parameter indicating assigned network address prefix by the user plane function.

According to a seventh aspect of the present disclosure, there is provided an apparatus for a user plane function. The apparatus comprises: a receiving unit, configured to receive, from a control plane function, a PFCP Session Modification Request for requesting the user plane function to assign a network address prefix to a terminal device; and a transmitting unit, configured to transmit, to the control plane function, a PFCP Session Modification Response including an assigned network address prefix. The PFCP Session Modification Request may include a first parameter indicating that the user plane function is delegated to assign the network address prefix, and the PFCP Session Modification Response may include a second parameter indicating assigned network address prefix by the user plane function.

Embodiments herein afford many advantages. For example, in embodiments herein, the specific procedure for the terminal device to obtain the network address prefix from a network entity (such as the user plane function) not directly requested by the terminal device may be defined. Therefore, the terminal device can obtain the network address prefix, even when a network entity (such as the control plane function) directly requested by the terminal device does not support assigning the network address prefix.

A person skilled in the art will recognize additional features and advantages upon reading the following detailed description. For example, further detailed parameters and messages utilized by the control plane function and the user plane function to assign the network address prefix to the terminal device are provided.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
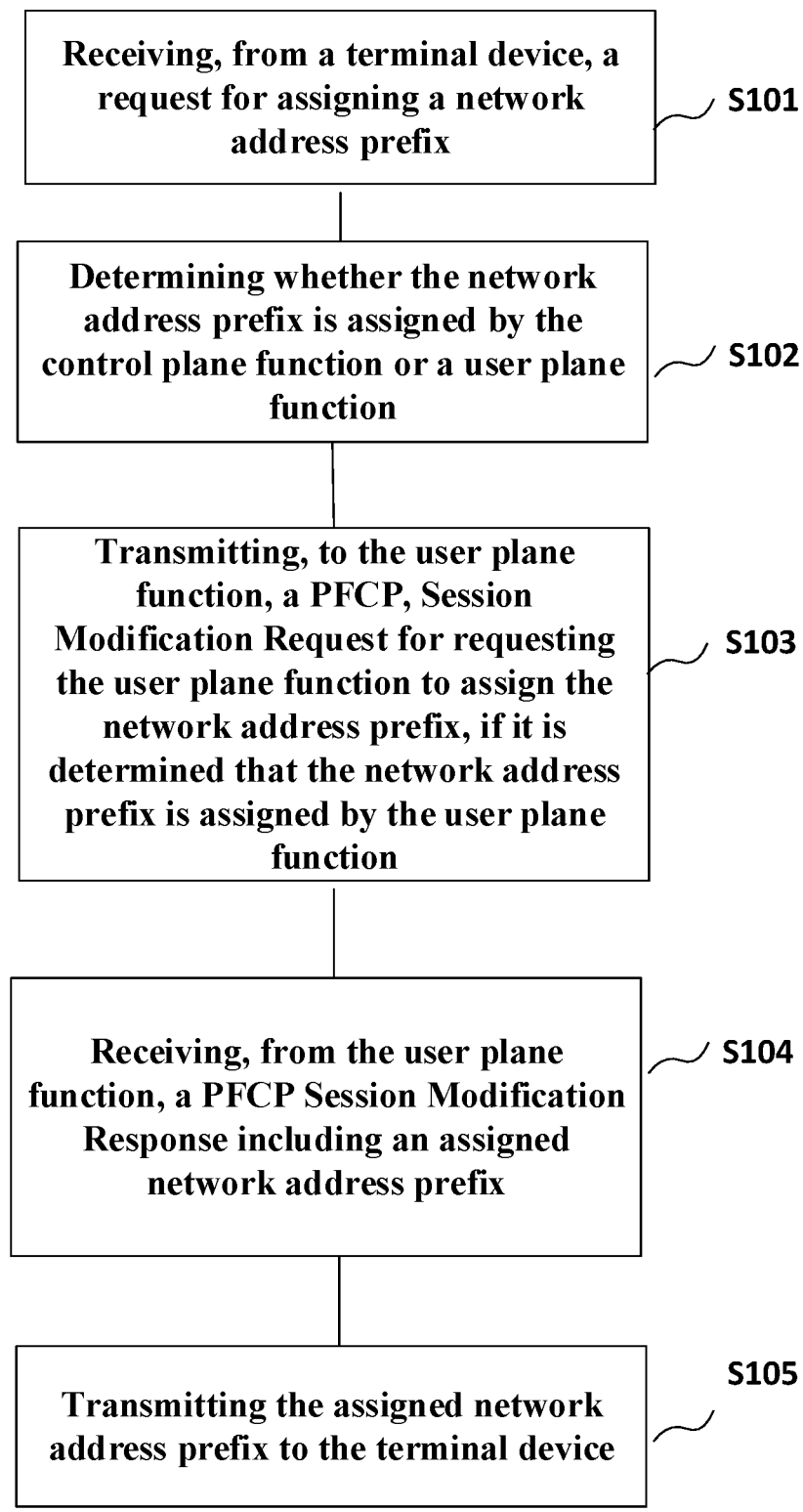
FIG. 1 is flowchart illustrating methods performed by a first network entity, according to exemplary embodiments of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network", "communication network" refers to a network following any suitable wireless communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3rd Generation Partnership Project (3GPP). For example, the communication protocols as may comprise the first generation (1G), 2G, 3G, 4G, 4.5G, 5G, 6G communication protocols, and/or any other protocols either currently known or to be developed in the future.

The term "entity", "network entity", "network function" may refer to a network device/apparatus/node/module with accessing capability in a communication network via which a terminal device accesses to the network and receives services therefrom. The entity/function may include a base station (BS), an access point (AP), a multi-cell/multicast coordination entity (MCE), a server node/function (such as a service capability server/application server, SCS/AS, group communication service application server, GCS AS, application function, AF), an exposure node (such as a service capability exposure function, SCEF, network exposure function, NEF), an access and mobility management function (AMF), a mobility management entity (MIME), a session management function (SMF), a packet data network gateway-control plane (PGW-C), a user plane function (UPF), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto node, a pico node, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As mentioned above, due to distribution of the tasks of the network, the configuration requested by the terminal device may be provided by a first network entity (which is requested by the terminal device, or is configured to handle the request from the terminal device), or by a second network entity (which is not directly requested by the terminal device, or not handle the original request from the terminal device). It is expected that the terminal device obtains the configuration by one request to the first network entity in either situation.

FIG. 1 is flowchart illustrating methods performed by a first network entity, according to exemplary embodiments of the present disclosure.

As an example without limitation, the first network entity may be a control plane function.

The method performed by a control plane function may comprise: S101, receiving, from a terminal device, a request for assigning a network address prefix; S102, determining whether the network address prefix is assigned by the control plane function or a user plane function; S103, transmitting, to the user plane function, a PFCP, Session Modification Request for requesting the user plane function to assign the network address prefix, if it is determined that the network address prefix is assigned by the user plane function; S104, receiving, from the user plane function, a PFCP Session Modification Response including an assigned network address prefix; and S105, transmitting the assigned network address prefix to the terminal device.

Further, the PFCP Session Modification Request may include a first parameter indicating that the user plane function is delegated to assign the network address prefix, and the PFCP Session Modification Response may include a second parameter indicating assigned network address prefix by the user plane function.

According to embodiments of the present disclosure, the specific procedure for the terminal device to obtain the network address prefix from a network entity (such as the user plane function) not directly requested by the terminal device may be defined. Therefore, the terminal device can obtain the network address prefix, even when a network entity (such as the control plane function) directly requested by the terminal device does not support assigning the network address prefix.

Figure 2:
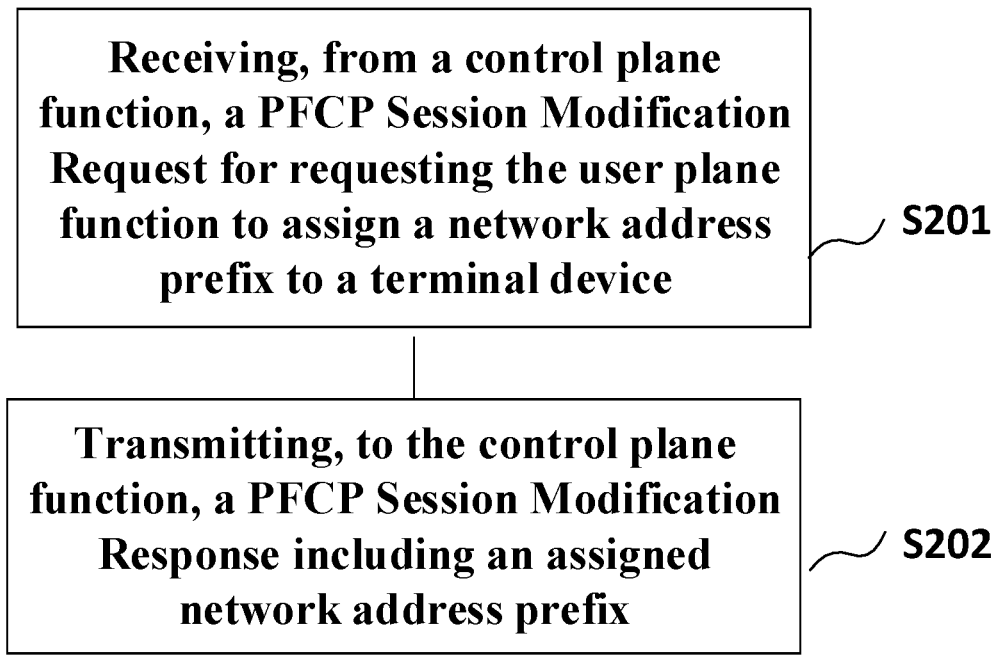
FIG. 2 is flowchart illustrating methods performed by a second network entity, according to exemplary embodiments of the present disclosure.

FIG. 2 is flowchart illustrating methods performed by a second network entity, according to exemplary embodiments of the present disclosure.

As an example without limitation, the second network entity may be a user plane function.

The method performed by the user plane function may comprise: S201, receiving, from a control plane function, a PFCP Session Modification Request for requesting the user plane function to assign a network address prefix to a terminal device; and S202, transmitting, to the control plane function, a PFCP Session Modification Response including an assigned network address prefix.

Further, the PFCP Session Modification Request may include a first parameter indicating that the user plane function is delegated to assign the network address prefix, and the PFCP Session Modification Response may include a second parameter indicating assigned network address prefix by the user plane function For example, further detailed parameters and messages utilized by the first network entity and the second network entity to assign the network address prefix to the terminal device are provided.

In exemplary embodiments of the present disclosure, the user plane function determines a length of the network address prefix based on a local configuration, or based on the PFCP Session Modification Request from the control plane function.

In exemplary embodiments of the present disclosure, the first parameter or the second parameter comprises a field for IPv6 Prefix Delegation Bits and/or a field for IPv6 Prefix Length.

In exemplary embodiments of the present disclosure, the IPv6 Prefix Delegation bits and/or IPv6 Prefix Length is set to zero.

It should be understood, the first parameter and the second parameter may be utilized either individually or combinedly. For example, in one situation, only when the first parameter is active and the second parameter is set to zero, the second network entity is requested. Further, other values instead of zero may be also used for the second parameter, as long as such values can be distinguished with the normal value range of the second parameter.

In exemplary embodiments of the present disclosure, the assigned network address prefix is an internet protocol version 6, IPv6, prefix.

In exemplary embodiments of the present disclosure, the second message comprises an information element for IP address of the terminal device; and the information element for IP address of the terminal device comprises the second parameter.

In exemplary embodiments of the present disclosure, an information element of Updated Packet Detection Rule, PDR includes the field for IPv6 Prefix Delegation Bits and/or the field for IPv6 Prefix Length.

In exemplary embodiments of the present disclosure, the control plane function comprises a session management function, SMF, and/or a packet data network gateway-control plane, PGW-C.

Further detailed embodiments with improvement to the current standards may be further illustrated below. However, it should be understood that the situation of the current standards is just examples for better illustration, but not limitation.

Clause 5.3.1.2.6 of 3GPP TS 23.401 Version 16.8.0 and clause 4.6.2.3 of 3GPP TS 23.316 Version 16.5.0 specify requirements for IPv6 Prefix Delegation via DHCPv6 (Dynamic Host Configuration Protocol for IPv6), that allow assigning a single network prefix shorter than the default /64 prefix to a PDN (Packet Data Network) connection or a PDU (Protocol Data Unit) session.

According to embodiments of the present disclosure, when UP function is requested (such as by the CP function) to perform UE IP address allocation and when IPv6 prefix delegation is used, the IPv6 prefix length may be determined by the CP function or the UP function:

If it is determined by the CP function, the IPv6 Prefix Delegation Bits or IPv6 Prefix Length fields shall be set according to the desired IPv6 prefix length in the request message by the CP function; or if the IPv6 prefix length is determined by the UP function, the CP function shall set the IPv6 Prefix Delegation Bits or IPv6 Prefix Length fields to "0".

Figure 3:
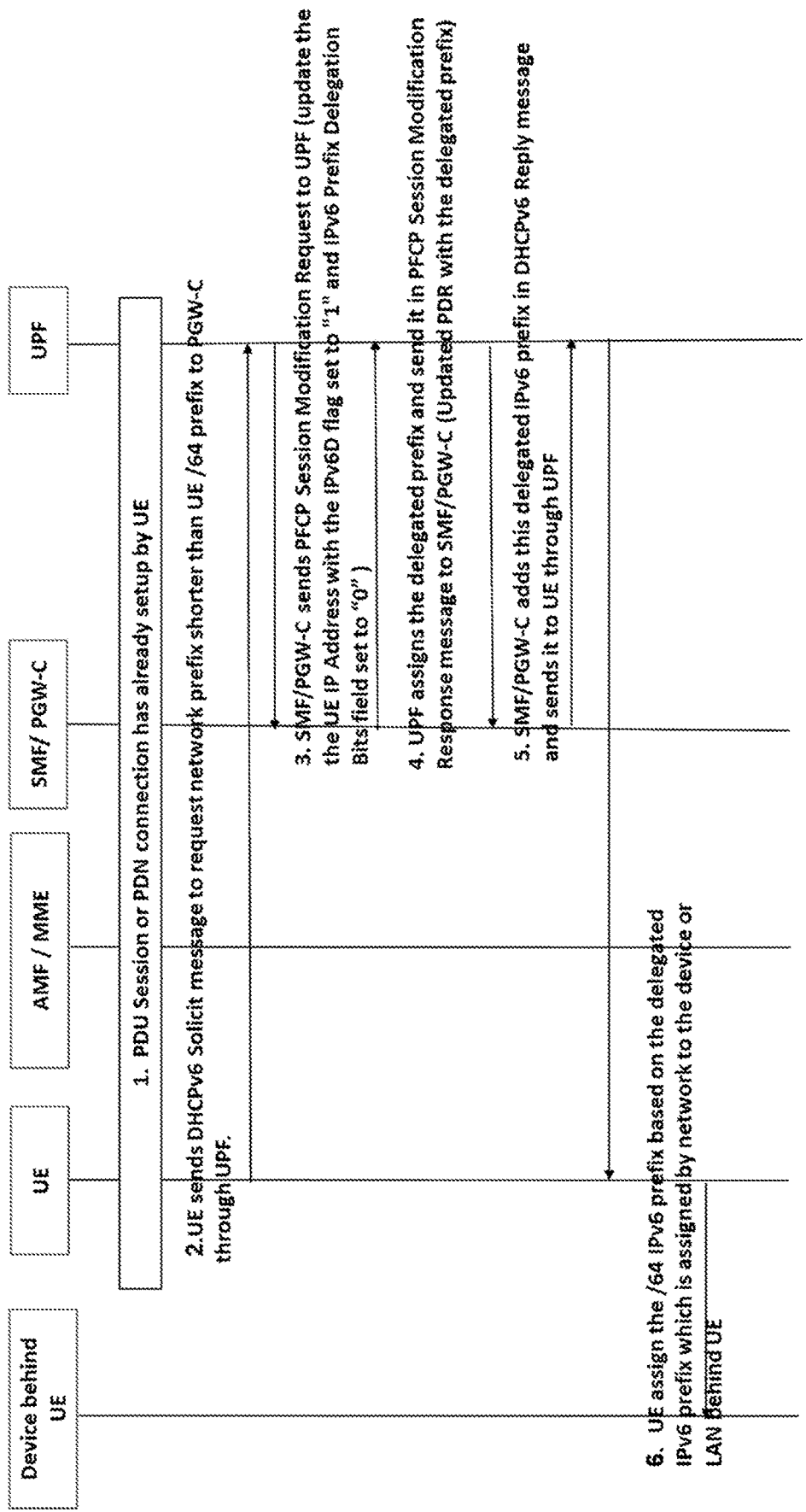
FIG. 3 is a signalling diagram according to exemplary embodiments of the present disclosure.

FIG. 3 is a signalling diagram according to exemplary embodiments of the present disclosure.

As shown in FIG. 3, in Step 1, PDU Session or PDN connection is setup successfully.

In step 2, user equipment may trigger DHCPv6 procedure to request shorter than default /64 prefix which is used for the device or local area network (LAN) behind user equipment, by sending a DHCPv6 solicit message. This message is sent to SMF or PGW-C through UPF. The UPF here does not directly handle this message.

In step 3, the SMF or PGW-C finds that UP is responsible for IP address management, SMF or PGW-C sends PFCP Session Modification to tell UPF assigning the delegated prefix.

Some flags, such as the IPv6D flag, or IP6PL (IPv6 Prefix Length) flag, in the PFCP Session Modification message may be set to 1 as active. Further, some parameters may be set to specifically defined values. For example, the IPv6 Prefix Delegation Bits (for the case when the IPv6D flag is set to "1") or IPv6 Prefix Length fields (for the case when IP6PL flag is set to "1") to "0". Table 1 shows an example for such fields.

TABLE 1

| UE IP Address | | | | | | | | |
|---|---|---|---|---|---|---|---|---|
| | Bits | | | | | | | |
| Octets | 8 | 7 | 6 | 5 | 4 | 3 | 2 | 1 |
| 1 to 2 | Type = 93 (decimal) | | | | | | | |
| 3 to 4 | Length = n | | | | | | | |
| 5 | Spare | IP6PL | CHV6 | CHV4 | IPv6D | S/D | V4 | V6 |
| m to (m + 3) | IPv4 address | | | | | | | |
| p to (p + 15) | IPv6 address | | | | | | | |
| r | IPv6 Prefix Delegation Bits | | | | | | | |
| s | IPv6 Prefix Length | | | | | | | |
| k to (n + 4) | These octet(s) is/are present only if explicitly specified | | | | | | | |

Octet r, if present, shall contain the number of bits allocated for IPv6 prefix delegation (relative to the default /64 IPv6 prefix), e.g. if /60 IPv6 prefix is used, the value shall be set to "4". When using UE IP address IE in a PDI to match packets, the UP function shall only use the IPv6 prefix part and ignore the interface identifier part. When the field is set to "0", the UP function shall determine a value based on the local configuration.

The IPv6 Prefix Length in octet s, when present, shall be encoded as an 8 bits binary integer, e.g. if /72 prefix is used, the value shall be set to (decimal) 72, or if /56 prefix is used, the value shall be set to (decimal) 56. The prefix length value "128" indicates an individual /128 IPv6 address. When the field is set to "0", the UP function shall determine a value based on the local configuration.

In step 4, UPF assigns the delegated prefix according to local policy and sends this delegated prefix to SMF or PGW-C in PFCP Session Modification Response message, using the IE Updated PDR including a newly added IE, such as the UE IP Address.

TABLE 2

| Updated PDR | | | | | | | |
|---|---|---|---|---|---|---|---|
| Updated PDR | C | This IE shall be present if a PDR previously created for the PFCP session needs to be modified to support the redundant transmission on N3/N9 interfaces. Or if the UP | — | — | — | X | Updated PDR |

TABLE 2-continued

Updated PDR function was requested to assign a network prefix shorter
than default /64 prefix.
Several IEs within the same IE type may be present to
represent a list of PDRs to update.

TABLE 3 content of the updated PDR

| Octet 1 and 2 | | Updated PDR IE Type = 256 (decimal) Length = n | | | | | |
|---|---|---|---|---|---|---|---|
| Octets 3 and 4 | | | | Appl. | | | |
| Information elements | P | Condition/Comment | Sx a | Sx b | Sx c | N4 | IE Type |
| PDR ID | M | |This IE shall uniquely identify the PDR among all the PDRs configured for that PFCP session. | — | — | — | X | PDR ID |
| Local F-TEID for Redundant Transmission | C | This IE shall be present and shall contain the local F-TEID to be used for this PDR for the reception of redundant uplink packets on the N3/N9 interfaces. | — | — | — | X | F-TEID |
| UE IP Address | C | If the UP function allocates the delegate prefix, this IE shall be present and shall contain the UE IP address/ delegated prefix assigned by the UP function. In the 5GC (5th generation core network), several IEs with the same IE type may be present to represent multiple UE IP addresses, if the UPF indicated support of the IP6PL feature. | — | X | — | X | UE IP Address |

According to embodiments of the present disclosure, the UE IP Address (which may be conditional) is added to the Updated PDR, and thus the Updated PDR may be used for the situation when the UP function was requested to assign a network prefix shorter than default /64 prefix.

As one example, an "/56 prefix", such as "2a00:20:87c1: 3500::/56", may be provided in the UE IP address in the updated PDR. Further, it should be understood that "shorter than default /64 prefix" is also just an example without limitation, a prefix equal to or even longer than default /64 prefix may be also possible.

In step 5, SMF or PGW-C organizes the DHCPv6 reply message including the delegated prefix and sends it to UE through UPF.

In step 6, user equipment can assign /64 prefix based on this delegated prefix from network to the device or LAN behind it. Namely, the user equipment here may be a router, or a server, or a management device for many other devices or even many subnetworks.

Figure 4:
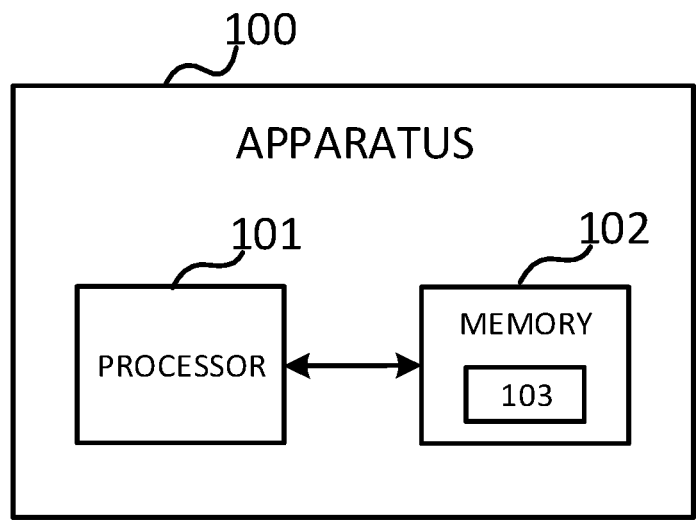
FIG. 4 is a block diagram illustrating an apparatus for the first network entity according to some embodiments of the present disclosure.

FIG. 4 is a block diagram illustrating an apparatus for the first network entity according to some embodiments of the present disclosure.

As shown in FIG. 4, there is provided a first network entity 100 (such as a control plane function), comprising: one or more processors 101; and one or more memories 102 comprising computer program codes 103, the one or more memories and the computer program codes configured to, with the one or more processors, cause the control plane function at least to: receive, from a terminal device, a request for assigning a network address prefix; determine whether the network address prefix is assigned by the control plane function or a user plane function; transmit, to the user plane function, a PFCP Session Modification Request for requesting the user plane function to assign the network address prefix, if it is determined that the network address prefix is assigned by the user plane function; receive, from the user plane function, a PFCP Session Modification Response including an assigned network address prefix; and transmit the assigned network address prefix to the terminal device. The PFCP Session Modification Request may include a first parameter indicating that the user plane function is delegated to assign the network address prefix, and the PFCP Session Modification Response may include a second parameter indicating assigned network address prefix by the user plane function.

In exemplary embodiments of the present disclosure, the one or more memories and the computer program codes are configured to, with the one or more processors, cause the first network entity to perform the method according to any one of embodiments above mentioned, such as the method in FIG. 1, 3.

Figure 5:
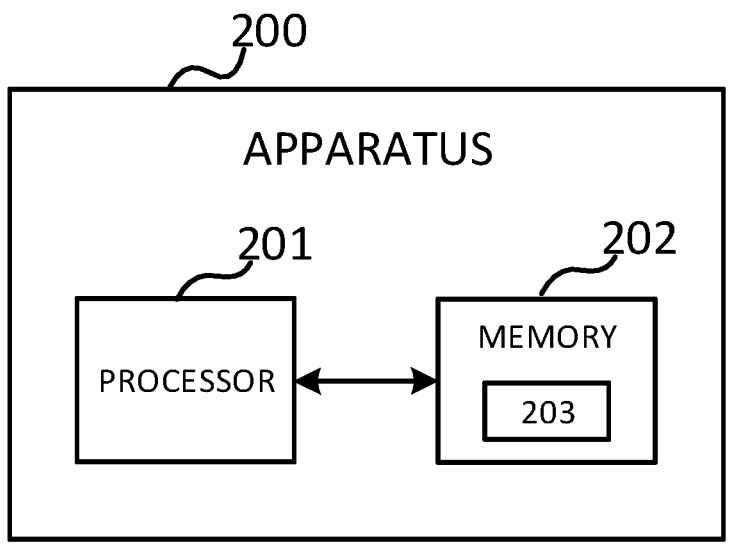
FIG. 5 is a block diagram illustrating an apparatus for the second network entity according to some embodiments of the present disclosure.

FIG. 5 is a block diagram illustrating an apparatus for the second network entity according to some embodiments of the present disclosure.

As shown in FIG. 5, there is provided a second network entity 200 (such as a user plane function), comprising: one or more processors 201; and one or more memories 202 comprising computer program codes 203, the one or more memories and the computer program codes configured to, with the one or more processors, cause the terminal device at least to: receive, from a control plane function, a PFCP Session Modification Request for requesting the user plane function to assign a network address prefix to a terminal device; transmit, to the control plane function, a PFCP Session Modification Response including an assigned network address prefix. The PFCP Session Modification Request may include a first parameter indicating that the user plane function is delegated to assign the network address prefix, and the PFCP Session Modification Response may include a second parameter indicating assigned network address prefix by the user plane function.

In exemplary embodiments of the present disclosure, the one or more memories and the computer program codes are configured to, with the one or more processors, cause the second network entity to perform the method according to any one of embodiments above mentioned, such as the method in FIG. 2, 3.

The processors 101, 201 may be any kind of processing component, such as one or more microprocessor or microcontrollers, as well as other digital hardware, which may include digital signal processors (DSPs), special-purpose digital logic, and the like. The memories 102, 202 may be any kind of storage component, such as read-only memory (ROM), random-access memory, cache memory, flash memory devices, optical storage devices, etc.

Figure 6:
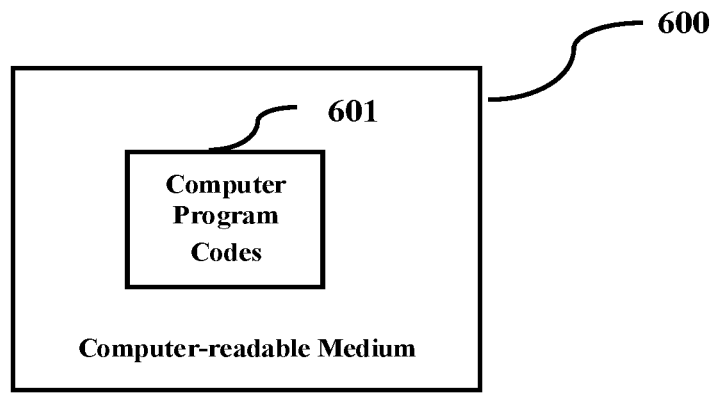
FIG. 6 is a block diagram showing an apparatus readable storage medium, according to embodiments of the present disclosure.

FIG. 6 is a block diagram showing an apparatus readable storage medium, according to embodiments of the present disclosure.

As shown in FIG. 6, there is provided a computer-readable medium 600 having computer program codes 601 embodied thereon for use with a network entity comprising a control plane function and/or a user plane function, wherein the computer program codes comprise codes for performing the method according to any one of embodiments above mentioned.

The computer readable storage medium 600 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

Figure 7:
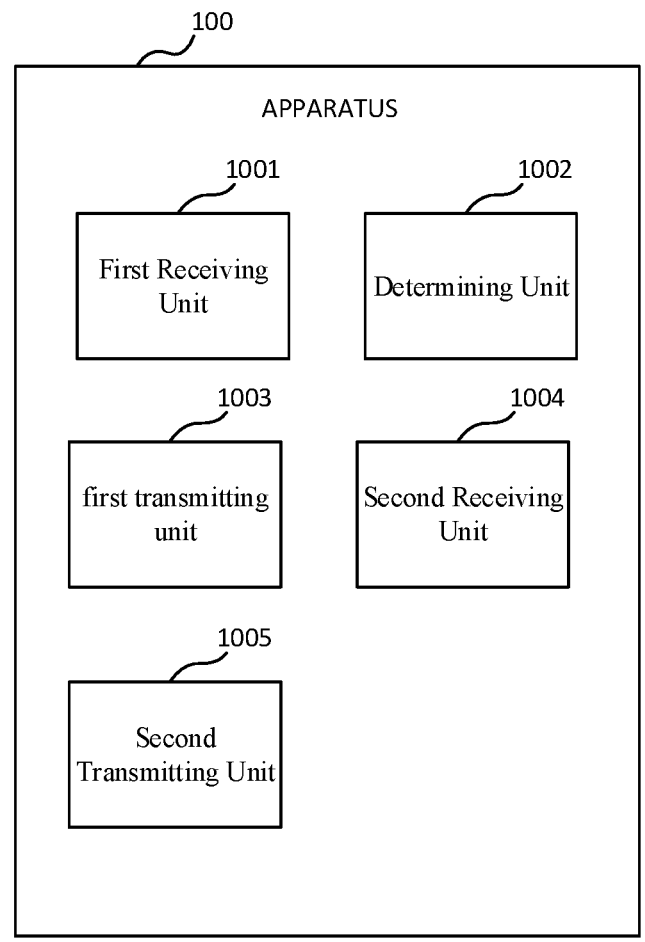
FIG. 7 is a block diagram illustrating another apparatus for the first network entity according to some embodiments of the present disclosure.

FIG. 7 is a block diagram illustrating another apparatus for the first network entity according to some embodiments of the present disclosure.

As shown in FIG. 7, there is provided an apparatus for a first network entity (such as a control plane function). The apparatus 100 comprises: a first receiving unit 1001, configured to receive, from a terminal device, a request for assigning a network address prefix; a determining unit 1002, configured to determine whether the network address prefix is assigned by the control plane function or a user plane function; a first transmitting unit 1003, configured to transmit, to the user plane function, a PFCP Session Modification Request for requesting the user plane function to assign the network address prefix, if it is determined that the network address prefix is assigned by the user plane function; a second receiving unit 1004, configured to receive, from the user plane function, a PFCP Session Modification Response including an assigned network address prefix; and a second transmitting unit 1005, configured to transmit the assigned network address prefix to the terminal device. The PFCP Session Modification Request may include a first parameter indicating that the user plane function is delegated to assign the network address prefix, and the PFCP Session Modification Response may include a second parameter indicating assigned network address prefix by the user plane function.

Figure 8:
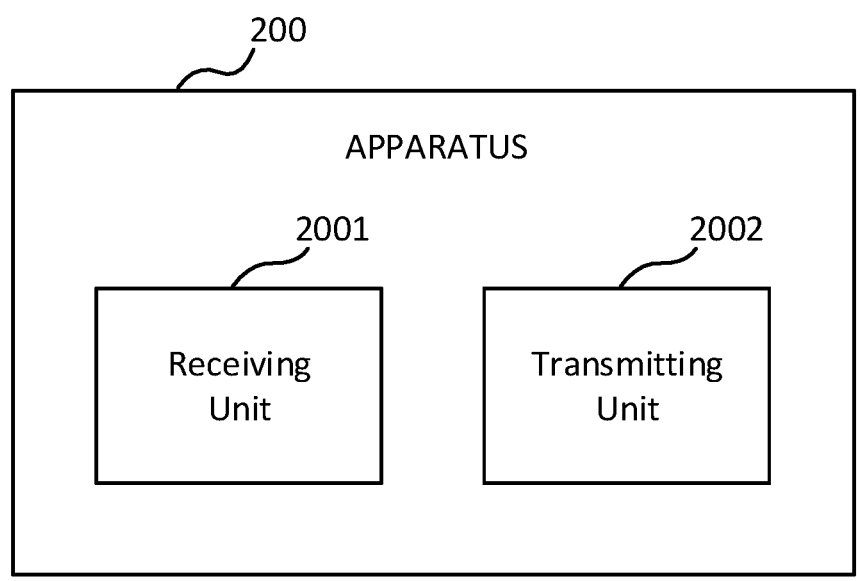
FIG. 8 is a block diagram illustrating another apparatus for the second network entity according to some embodiments of the present disclosure.

FIG. 8 is a block diagram illustrating another apparatus for the second network entity according to some embodiments of the present disclosure.

As shown in FIG. 8, there is provided an apparatus for a second network entity (such as a user plane function). The apparatus 200 comprises: a receiving unit 2001, configured to receive, from a control plane function, a PFCP Session Modification Request for requesting the user plane function to assign a network address prefix to a terminal device; and a transmitting unit 2002, configured to transmit, to the control plane function, a PFCP Session Modification Response including an assigned network address prefix. The PFCP Session Modification Request may include a first parameter indicating that the user plane function is delegated to assign the network address prefix, and the PFCP Session Modification Response may include a second parameter indicating assigned network address prefix by the user plane function.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, the communication management node or network node may not need a fixed processor or memory, any computing resource and storage resource may be arranged from at least one node in the communication system. The introduction of virtualization technology and network computing technology may improve the usage efficiency of the network resources and the flexibility of the network.

According to embodiments of the present disclosure, if IP address management is done by UP and UP is expected to assign the delegated prefix, a clear definition about how to do it is provided.

The embodiments of the present disclosure may propose the following solutions: to define the behavior for CP to tell UP that the delegate prefix is assigned by UP when CP receives the request from UE; to define the behavior for UP to tell CP what delegated prefix is used, so that CP can send the reply message to UE with the delegate prefix; and/or to defined prefix delegate assigned by UP in standards.

Figure 9:
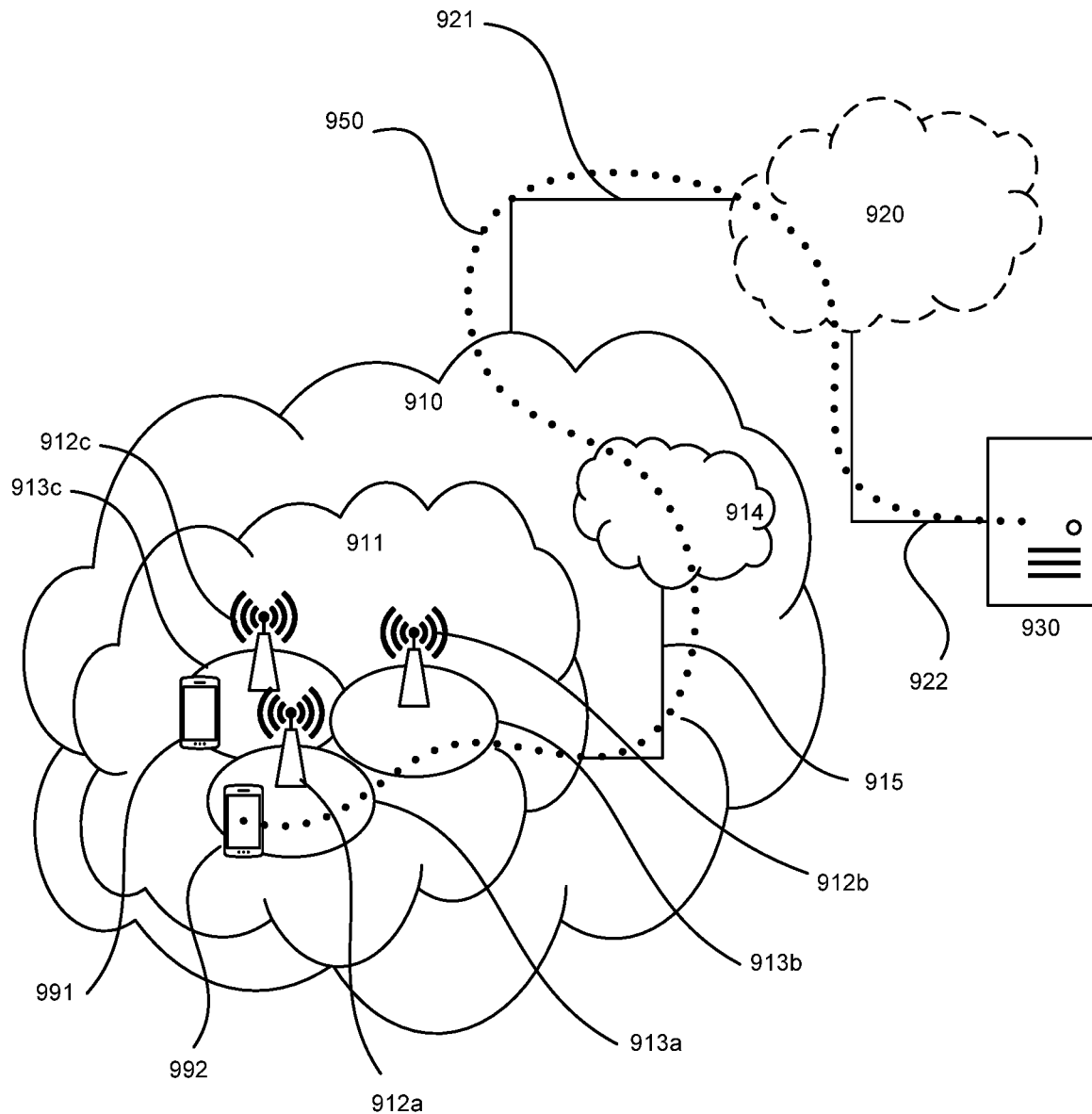
FIG. 9 is a block diagram illustrating a telecommunication network connected via an intermediate network to a host computer in accordance with some embodiments of the present disclosure.

FIG. 9 is a block diagram illustrating a telecommunication network connected via an intermediate network to a host computer in accordance with some embodiments of the present disclosure.

With reference to FIG. 9, in accordance with an embodiment, a communication system includes a telecommunication network 910, such as a 3GPP-type cellular network, which comprises an access network 911, such as a radio access network, and a core network 914. The access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to the core network 914 over a wired or wireless connection 915. A first UE 991 located in a coverage area 913c is configured to wirelessly connect to, or be paged by, the corresponding base station 912c. A second UE 992 in a coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. Connections 921 and 922 between the telecommunication network 910 and the host computer 930 may extend directly from the core network 914 to the host computer 930 or may go via an optional intermediate network 920. An intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 9 as a whole enables connectivity between the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, the base station 912 may not or need not be informed about the past routing of an incoming downlink communication with data originating from the host computer 930 to be forwarded (e.g., handed over) to a connected UE 991. Similarly, the base station 912 need not be aware of the future routing of an outgoing uplink communication originating from the UE 991 towards the host computer 930.

Figure 10:
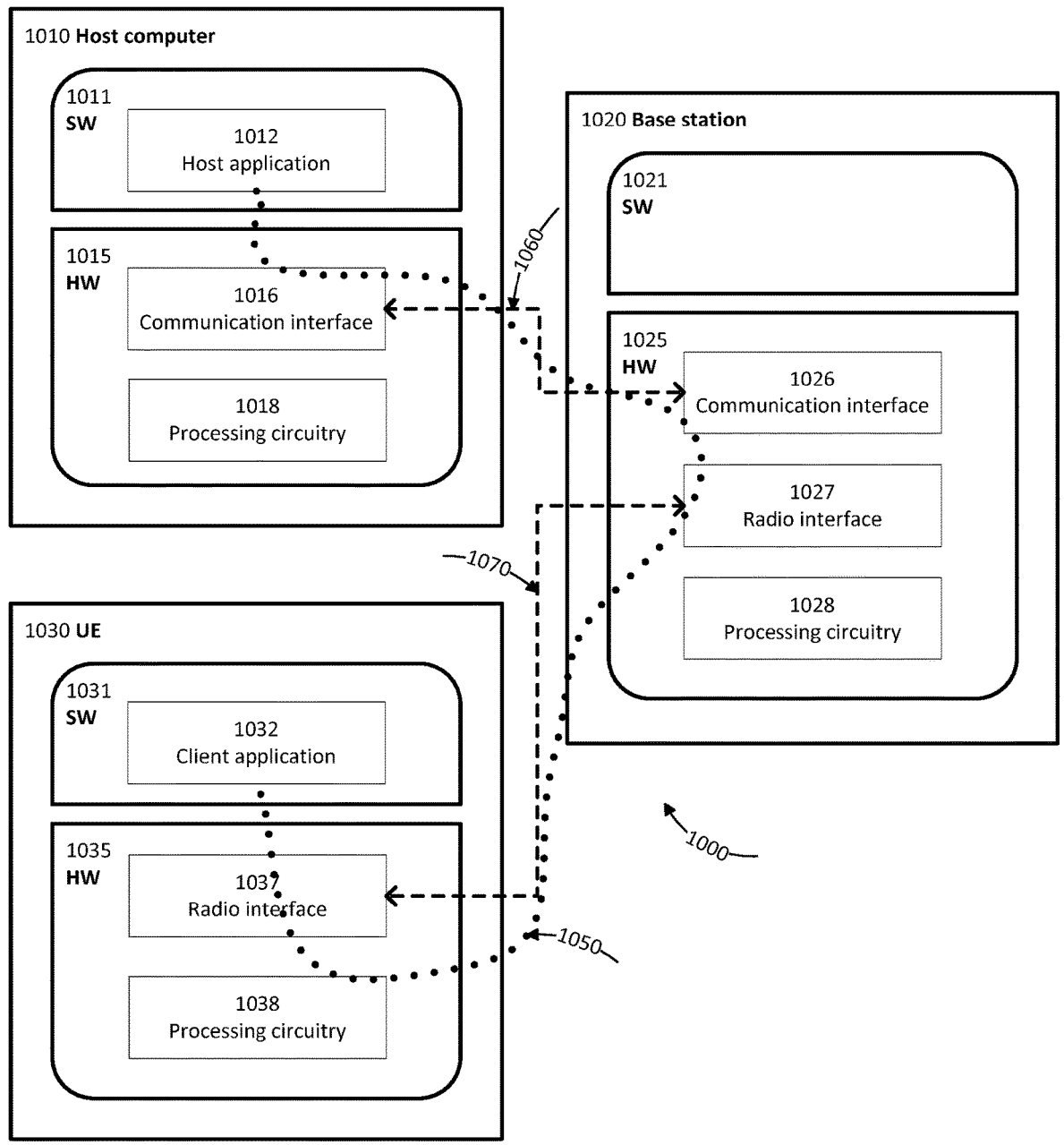
FIG. 10 is a block diagram illustrating a host computer communicating via a base station with a UE over a partially wireless connection in accordance with some embodiments of the present disclosure.

FIG. 10 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises a processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with the UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes a processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes a processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

It is noted that the host computer 1010, the base station 1020 and the UE 1030 illustrated in FIG. 10 may be similar or identical to the host computer 930, one of base stations 912a, 912b, 912c and one of UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the UE 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

Wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 1050 between the host computer 1010 and the UE 1030, in response to variations in the measurement results. The measurement procedure and/or the network functionality for reconfiguring the OTT connection 1050 may be implemented in software 1011 and hardware 1015 of the host computer 1010 or in software 1031 and hardware 1035 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which the software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer 1010's measurements of throughput, propagation times, latency and the like. The measurements may be implemented in that the software 1011 and 1031 causes messages to be transmitted, in particular empty or 'dummy' messages, using the OTT connection 1050 while it monitors propagation times, errors etc.

Figure 11:
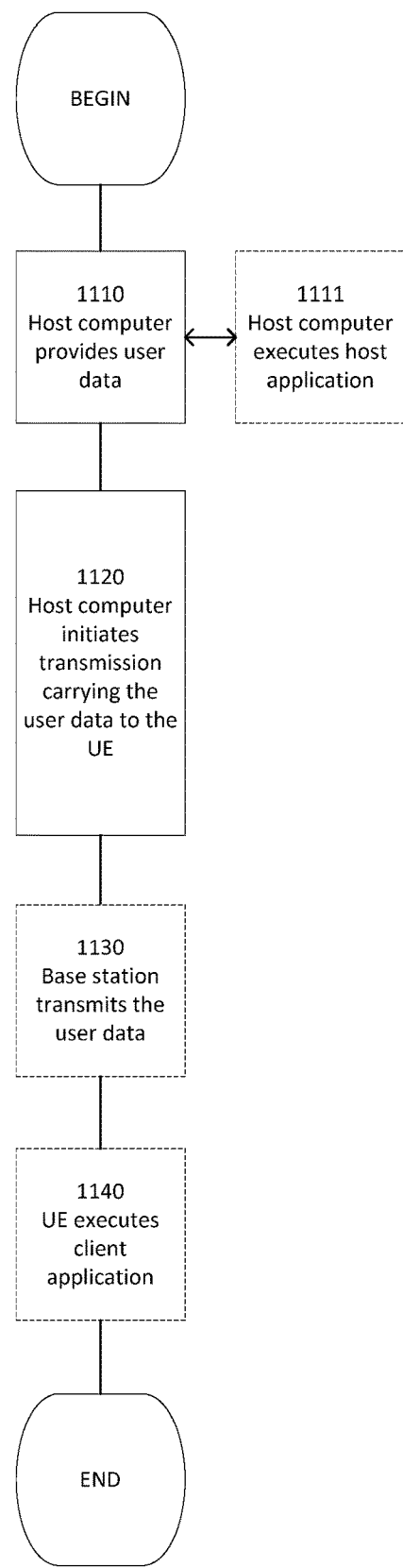
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
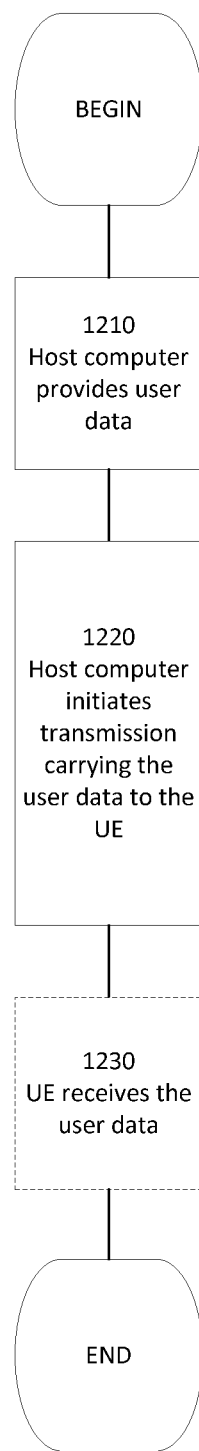
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
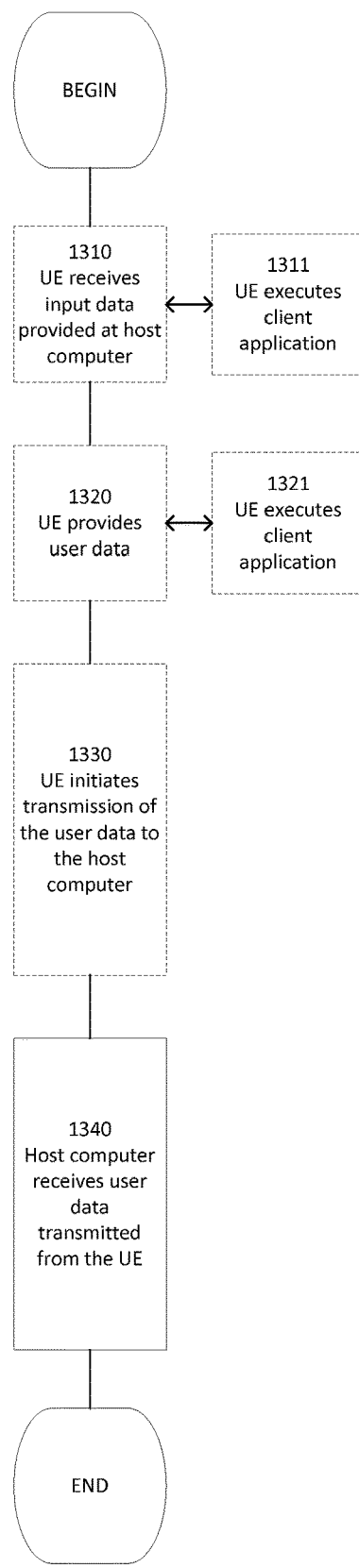
FIG. 13 is a flowchart illustrating a method implemented in a communication system, in accordance with an embodiment of the present disclosure.

FIG. 13 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
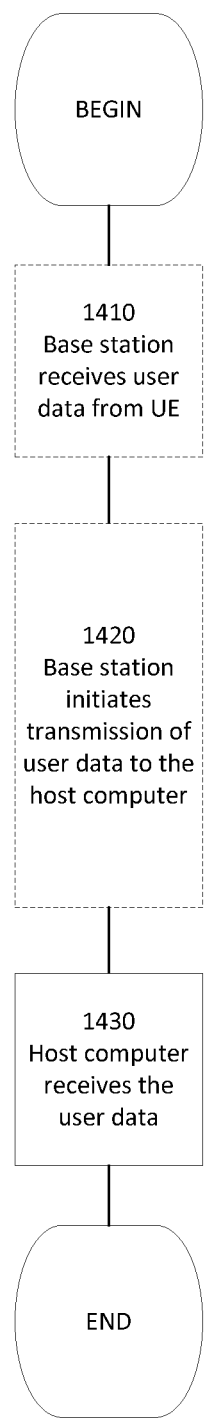
FIG. 14 is a flowchart illustrating a method implemented in a communication system, in accordance with an embodiment of the present disclosure.

FIG. 14 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a control plane function, comprising:
    receiving, from a terminal device, a request for assigning a network address prefix;
    determining whether the network address prefix is to be assigned by the control plane function or a user plane function;
    transmitting, to the user plane function, a Packet Forwarding Control Protocol, PFCP, Session Modification Request for requesting the user plane function to assign the network address prefix, if it is determined that the network address prefix is to be assigned by the user plane function;
    receiving, from the user plane function, a PFCP Session Modification Response including an assigned network address prefix; and
    transmitting the assigned network address prefix to the terminal device,
    wherein the PFCP Session Modification Request includes a first parameter indicating that the user plane function is delegated to assign the network address prefix, and wherein the PFCP Session Modification Response includes a second parameter indicating assigned network address prefix by the user plane function;
    wherein the PFCP Session Modification Request includes a field for IPv6 Prefix Delegation Bits and/or a field for IPv6 Prefix Length;
    wherein the field for IPv6 Prefix Delegation Bits and/or the field for IPv6 Prefix Length indicates a length of the network address prefix, or the field for IPv6 Prefix Delegation Bits and/or the field for IPv6 Prefix Length is set to zero to indicate that the user plane function determines the length of the network address prefix based on a local configuration.

2. The method according to claim 1, wherein the first parameter or the second parameter comprises a field for IPv6 Prefix Delegation Bits and/or a field for IPv6 Prefix Length.

3. The method according to claim 2, wherein the IPv6 Prefix Delegation bits and/or IPv6 Prefix Length is set to zero.

4. The method according to claim 1,
    wherein the assigned network address prefix is an internet protocol version 6, IPv6, prefix.

5. The method according to claim 1,
    wherein the PFCP Session Modification Response comprises an information element for IP address of the terminal device; and
    wherein the information element for IP address of the terminal device comprises the second parameter.

6. The method according to claim 5,
wherein an information element of Updated Packet Detection Rule, PDR includes the field for IPv6 Prefix Delegation Bits and/or the field for IPv6 Prefix Length.

7. The method according to claim 1,
    wherein the control plane function comprises a session management function, SMF, and/or a packet data network gateway-control plane, PGW-C.

8. A method performed by a user plane function, comprising:
    receiving, from a control plane function, a Packet Forwarding Control Protocol, PFCP, Session Modification Request for requesting the user plane function to assign a network address prefix to a terminal device;
    transmitting, to the control plane function, a PFCP Session Modification Response including an assigned network address prefix,
    wherein the PFCP Session Modification Request includes a first parameter indicating that the user plane function is delegated to assign the network address prefix, and wherein the PFCP Session Modification Response includes a second parameter indicating assigned network address prefix by the user plane function;
    wherein the PFCP Session Modification Request includes a field for IPv6 Prefix Delegation Bits and/or a field for IPv6 Prefix Length;
    wherein the field for IPv6 Prefix Delegation Bits and/or the field for IPv6 Prefix Length indicates a length of the network address prefix, or the field for IPv6 Prefix Delegation Bits and/or the field for IPv6 Prefix Length is set to zero to indicate that the user plane function determines the length of the network address prefix based on a local configuration.

9. The method according to claim 8, wherein the user plane function determines the length of the network address prefix based on a local configuration, or based on the PFCP Session Modification Request from the control plane function.

10. The method according to claim 8, wherein the first parameter or the second parameter comprises a field for IPv6 Prefix Delegation Bits and/or a field for IPv6 Prefix Length.

11. The method according to claim 10, wherein the IPv6 Prefix Delegation bits and/or IPv6 Prefix Length is set to zero.

12. The method according to claim 8,
wherein the assigned network address prefix is an internet protocol version 6, IPv6, prefix.

13. The method according to claim 8,
    wherein the second message comprises an information element for IP address of the terminal device; and
    wherein the information element for IP address of the terminal device comprises the second parameter.

14. The method according to claim 13,
wherein an information element of Updated Packet Detection Rule, PDR includes the field for IPv6 Prefix Delegation Bits and/or the field for IPv6 Prefix Length.

15. The method according to claim 14,
wherein the control plane function comprises a session management function, SMF, and/or packet data network gateway-control plane, PGW-C.

16. A control plane function, comprising:
one or more processors; and
one or more memories comprising computer program codes,
the one or more memories and the computer program codes configured to, with the one or more processors, cause the terminal device at least to:
  receive, from a terminal device, a request for assigning a network address prefix; determine whether the network address prefix is to be assigned by the control plane function or a user plane function;
  transmit, to the user plane function, a Packet Forwarding Control Protocol, PFCP, Session Modification Request for requesting the user plane function to assign the network address prefix, if it is determined that the network address prefix is to be assigned by the user plane function;
  receive, from the user plane function, a PFCP Session Modification Response including an assigned network address prefix; and
  transmit the assigned network address prefix to the terminal device,
  wherein the PFCP Session Modification Request includes a first parameter indicating that the user plane function is delegated to assign the network address prefix, and wherein the PFCP Session Modification Response includes a second parameter indicating assigned network address prefix by the user plane function;
  wherein the PFCP Session Modification Request includes a field for IPv6 Prefix Delegation Bits and/or a field for IPv6 Prefix Length;
  wherein the field for IPv6 Prefix Delegation Bits and/or the field for IPv6 Prefix Length indicates a length of the network address prefix, or the field for IPv6 Prefix Delegation Bits and/or the field for IPv6 Prefix Length is set to zero to indicate that the user plane function determines the length of the network address prefix based on a local configuration.

17. The control plane function according to claim 16, wherein the first parameter or the second parameter comprises a field for IPv6 Prefix Delegation Bits and/or a field for IPv6 Prefix Length.

18. A user plane function, comprising:
one or more processors; and
one or more memories comprising computer program codes,
the one or more memories and the computer program codes configured to, with the one or more processors, cause the terminal device at least to:
  receive, from a control plane function, a Packet Forwarding Control Protocol, PFCP, Session Modification Request for requesting the user plane function to assign a network address prefix to a terminal device;
  transmit, to the control plane function, a PFCP Session Modification Response including an assigned network address prefix,
  wherein the PFCP Session Modification Request includes a first parameter indicating that the user plane function is delegated to assign the network address prefix, and wherein the PFCP Session Modification Response includes a second parameter indicating assigned network address prefix by the user plane function;
  wherein the PFCP Session Modification Request includes a field for IPv6 Prefix Delegation Bits and/or a field for IPv6 Prefix Length;
  wherein the field for IPv6 Prefix Delegation Bits and/or the field for IPv6 Prefix Length indicates a length of the network address prefix, or the field for IPv6 Prefix Delegation Bits and/or the field for IPv6 Prefix Length is set to zero to indicate that the user plane function determines the length of the network address prefix based on a local configuration.

19. The user plane function according to claim 18, wherein the user plane function determines the length of the network address prefix based on a local configuration, or based on the PFCP Session Modification Request from the control plane function.

20. The user plane function according to claim 18, wherein the first parameter or the second parameter comprises a field for IPv6 Prefix Delegation Bits and/or a field for IPv6 Prefix Length.

* * * * *